(12) United States Patent
Wu

(10) Patent No.: US 11,096,336 B2
(45) Date of Patent: Aug. 24, 2021

(54) STORAGE ASSEMBLY

(71) Applicant: Chi Pan Precision Tool Co., Ltd., Taichung (TW)

(72) Inventor: Kuo Hsien Wu, Taichung (TW)

(73) Assignee: Chi Pan Precision Tool Co., Ltd., Taichung (TW)

( * ) Notice: Subject to any disclaimer, the term of this patent is extended or adjusted under 35 U.S.C. 154(b) by 68 days.

(21) Appl. No.: 16/577,134

(22) Filed: Sep. 20, 2019

(65) Prior Publication Data

US 2021/0084830 A1    Mar. 25, 2021

(51) Int. Cl.

| B65D 1/34 | (2006.01) |
|---|---|
| B25H 3/00 | (2006.01) |
| A01G 9/02 | (2018.01) |
| B65D 25/04 | (2006.01) |
| B65D 43/16 | (2006.01) |
| A01G 9/24 | (2006.01) |
| A01K 63/00 | (2017.01) |
| A01K 63/06 | (2006.01) |
| A01G 9/00 | (2018.01) |
| B65D 25/10 | (2006.01) |

(52) U.S. Cl.
CPC ............... *A01G 9/028* (2013.01); *B65D 1/34* (2013.01); *B65D 25/04* (2013.01); *B65D 43/16* (2013.01); *A01G 9/249* (2019.05); *A01G 2009/003* (2013.01); *A01K 63/003* (2013.01); *A01K 63/06* (2013.01); *B25H 3/003* (2013.01); *B65D 25/10* (2013.01)

(58) Field of Classification Search
CPC .......... B65D 1/34; B65D 43/14; B65D 43/16; B65D 43/02; B65D 43/0204; B65D 43/0206; B65D 43/0212; B65D 25/10; B25H 3/00; B25H 3/003; B25H 3/04; B25H 3/06
USPC ....... 206/216, 234, 372, 373, 377, 378, 379, 206/423
See application file for complete search history.

(56) References Cited

U.S. PATENT DOCUMENTS

| 5,379,885 A | * | 1/1995 | Chen | .......... | B25H 3/04 206/216 |
| 6,105,768 A | * | 8/2000 | Brown | ...... | B25H 3/04 206/373 |
| 6,360,891 B1 | * | 3/2002 | Rideout | .......... | B25H 3/00 206/372 |
| 6,938,766 B1 | * | 9/2005 | Lee | ............ | A47F 5/02 206/388 |
| 7,954,650 B1 | * | 6/2011 | Malik | ....... | B25H 3/04 211/70.6 |

(Continued)

*Primary Examiner* — Steven A. Reynolds
*Assistant Examiner* — Javier A Pagan
(74) *Attorney, Agent, or Firm* — Alan D. Kamrath; Karin L. Williams; Mayer & Williams PC

(57) ABSTRACT

A storage assembly includes a body with a space defined axially therethrough. A tray is connected to the top of the body and multiple pivotable members are pivotably connected to the body and the tray. Each member includes a reception portion for storage purpose, and a cover is mounted to the reception portion. A tube is inserted in a connection portion of the tray and receives fishes and plants in the tube. A base is connected to the underside of the body and is connected with a light device on the top thereof. The pivotable members can be pivoted to enclose the tube or to be pivoted outward around the tube.

15 Claims, 7 Drawing Sheets

(56) References Cited

U.S. PATENT DOCUMENTS

| | | | | |
|---|---|---|---|---|
| 8,851,283 B2* | 10/2014 | Wu | .......................... | A47G 7/06 |
| | | | | 206/377 |
| 9,625,143 B2* | 4/2017 | Hsu | .......................... | B25H 3/02 |
| 9,956,684 B2* | 5/2018 | Welfel | ..................... | B25H 3/06 |
| D874,828 S * | 2/2020 | Feyereisen | ..................... | D3/315 |

* cited by examiner

STORAGE ASSEMBLY

BACKGROUND OF THE INVENTION

1. Fields of the Invention

The present invention relates to a storage assembly, and more particularly, to a storage assembly with display and decoration features.

2. Descriptions of Related Art

A conventional storage assembly known to applicant includes a main receiving box and a cover is mounted to the main receiving box. Multiple receiving units are movably received in the main receiving box to manage different products or goods. When in use, the user pivots the cover relative to the main receiving box, and the receiving units can be slid out from the main receiving box so that the user can access the products or goods in the receiving units.

However, the receiving units may be separated from the main receiving box if the user pulls the receiving units too hard. The receiving units then have to be re-inserted into the main receiving box again. Besides, the conventional storage assembly does not have display and decoration features so that the conventional storage assembly cannot put on the desk or table.

The present invention intends to provide a storage assembly with display and decoration features to eliminate the shortcomings mentioned above.

SUMMARY OF THE INVENTION

The present invention relates to a storage assembly and comprises a body, and a tray is connected to the top of the body. A tube is connected to the tray and includes a room therein for having fishes and plants farmed therein. Multiple pivotable members are pivotably connected to the body and the tray, and each pivotable member has a reception portion for storage purpose. The pivotable members are pivoted to enclose the tube or to be pivoted outward relative to the tube to allow the uses to access the reception portions.

The body has multiple notches in the top thereof, and multiple recessed areas are defined along outer periphery of the body and communicate with the notches respectively. The tray includes a board which includes multiple bores. The connection portion is defined in the center of the tray. Multiple bolts extend through the bores of the board and are connected to top threaded holes of the body. The tube includes multiple restriction recesses on the outside of the top thereof.

Each pivotable member includes a pivot and a rod which extends from one end of the pivotable member and is connected to the pivot. The pivot is pivotably received in the notch corresponding thereto and does not drop from the notch. The rod is movably accommodated in the recessed area corresponding thereto. A hook is formed on the inside of each pivotably member so as to be hooked to the restriction recess of the tube when the pivotable member is pivoted toward the tube.

Preferably, the maximum width of each of the recessed areas is smaller than the maximum diameter of each of the notches.

Preferably, the board of the tray includes multiple openings defined in the outer periphery thereof, and the openings each are located corresponding to the notch and the recessed area corresponding thereto. The width of each of the openings is smaller than the maximum diameter of the notch corresponding thereto. The width of each of the openings is larger than the maximum diameter of the rod corresponding thereto, so that the rod removably enters into the opening.

Preferably, the width of each of the openings is smaller than the maximum diameter of the pivot corresponding thereto so that the pivot is restricted within the notch.

Preferably, the board of the tray has multiple reception areas defined therein which are located between the connection portion and the openings.

Preferably, the body includes multiple flanges extending upward along the top thereof so as to form a shoulder between the flange and the inner periphery of the body. The board of the tray is restricted by the flanges.

Preferably, the shoulder formed by each of the flanges is not lower than a top edge of each of the notches.

Preferably, each of the flanges is located between two consecutive notches.

Preferably, the room of the tube is defined axially therein which opens through the top end of the tube.

Preferably, a cover is mounted to the reception portion of each of the pivotable members to close the reception portion.

Preferably, the body includes a space defined through the top and the bottom thereof. Multiple bottom threaded holes are formed in the inner periphery of the body and open toward the underside of the body. A base includes multiple positioning holes. A bolt extends through each of the positioning holes and is connected to each of the bottom threaded holes to connect the base to the body.

Preferably, the base includes a base board which is connected to the underside of the body and includes the positioning holes. An annular wall extends upward from the periphery of the base board. Multiple radial holes are defined through the annular wall so as to accommodate a power control unit. A column extends upward from the base board and is connected with a light unit.

Preferably, the column includes an accommodation area which receives a battery or the light unit. A bottom board includes an insertion which is accommodated in the accommodation area.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
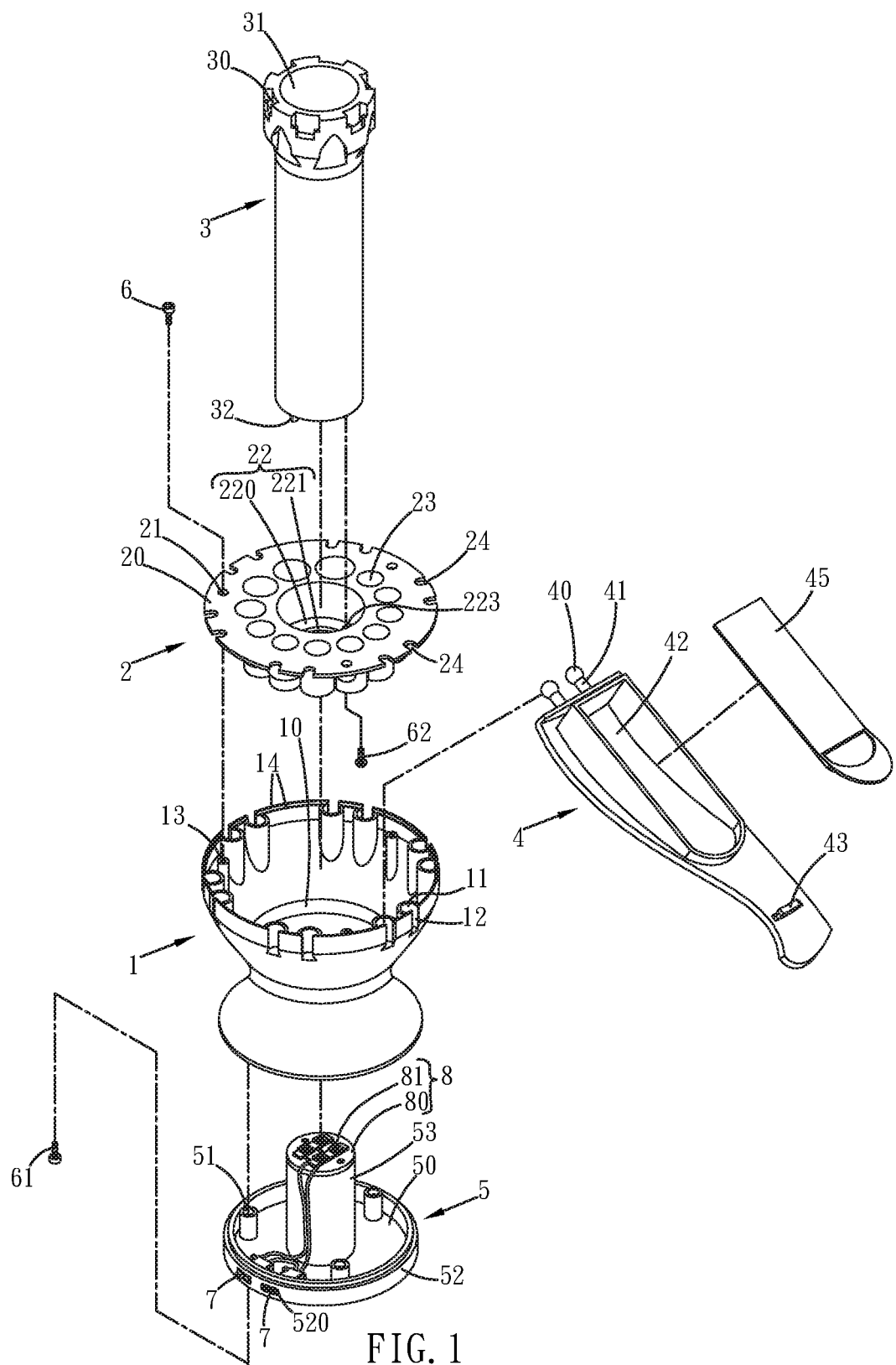
FIG. 1 is an exploded view to show the storage assembly of the present invention.

Referring to FIGS. 1 to 6, the storage assembly of the present invention comprises a body 1, and a tray 2 is connected to the top of the body 1. The tray 2 is connected to the body 1 by multiple bolts 6. A tube 3 is connected to a connection portion 22 of the tray 2. Multiple pivotable members 4 are pivotably connected to the body 1 and the tray 2. The pivotable members 4 enclose the tube 3 when the pivotable members 4 are folded, or the pivotable members 4 are pivoted outward relative to the tube 3.

Figure 4:
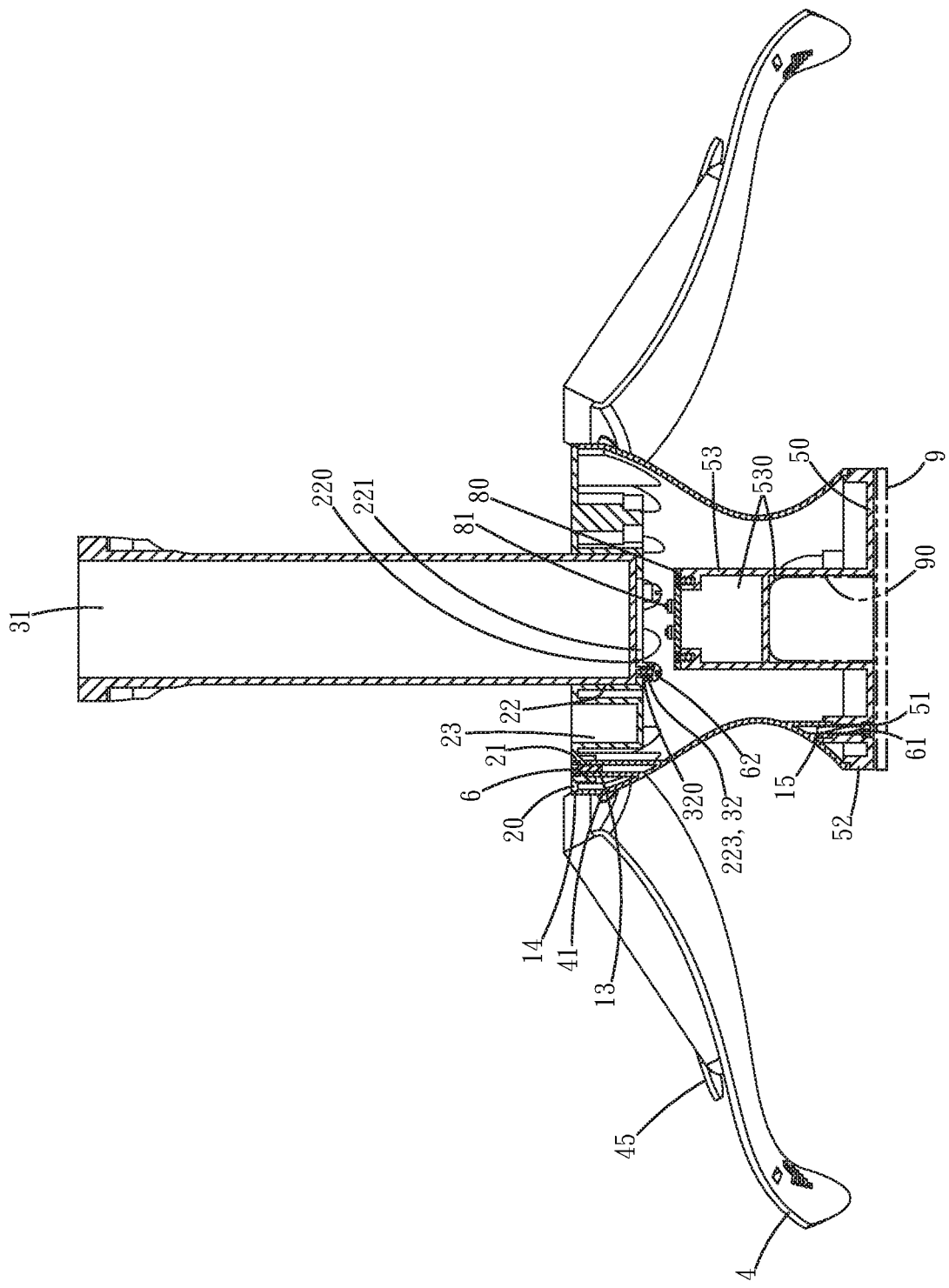
FIG. 4 is another cross sectional view of the storage assembly of the present invention.

The body 1 has multiple notches 11 defined in the top thereof and multiple recessed areas 12 are defined along the outer periphery of the body 1 and communicate with the notches 11 respectively. Multiple top threaded holes 13 are defined in the top of the body 1. The tray 2 includes a board 20 which includes multiple bores 21. The connection portion 22 is defined in the center of the tray 2. The multiple bolts 6 extend through the bores 21 of the board 20 and are connected to the top threaded holes 13 of the body 1. The body 1 includes multiple flanges 14 extending upward along the top thereof so as to form a shoulder between the flange 14 and the inner periphery of the body 1. The board 20 of the tray 2 is restricted by the flanges 14. The maximum width of each of the recessed areas 12 is smaller than the maximum diameter of each of the notches 11 so as to prevent the pivot 40 of the pivotable members 4 drops off from the notch 11. The shoulder formed by each of the flanges 14 is not lower than the top edge of each of the notches 11. Each of the flanges 14 is located between two consecutive notches 11. The body 1 includes a space 10 defined through the top and the bottom thereof. Multiple bottom threaded holes 15 are formed in the inner periphery of the body 1 and open toward the underside of the body 1. A base 5 includes multiple positioning holes 51, and a bolt 61 extends through each of the positioning holes 51 and is connected to each of the bottom threaded holes 15 to connect the base 5 to the body 1 as shown in FIG. 4.

The tube 3 includes the first end inserted into the connection portion 22 of the tray 2, and the second end of the tube 3 includes multiple restriction recesses 30. The board 20 of the tray 2 includes multiple openings 24 defined in the outer periphery thereof. The openings 24 each are located corresponding to the notch 11 and the recessed area 12 corresponding thereto. The board 20 of the tray 2 has multiple reception areas 23 defined therein which are located between the connection portion 22 and the openings 24. The connection portion 22 includes an inner bottom 220 and a through hole 221 is defined through the inner bottom 220. There are multiple fixing holes 223 defined through the inner bottom 220 as shown in FIG. 4 so that the protrusions 32 on the tube 3 extend through the fixing holes 223. Bolts 62 are threadedly connected to the threaded holes 320 of the protrusions 32 to connect the tube 3 to the tray 2 as shown in FIG. 4. The width of each of the openings 24 is smaller than the maximum diameter of the notch 11 corresponding thereto. The width of each of the openings 24 is larger than the maximum diameter of the rod 41 corresponding thereto. In other words, the width of each of the openings 24 is smaller than the maximum diameter of the pivot 40 corresponding thereto and the maximum diameter of the notch 11, so that the pivot 40 is restricted within the notch 11, and the rod 41 is freely moved relative to the opening 24. The reception areas 23 are used to receive food, cookies, candy, cosmetic products such as lip sticks or the like, stationary such as pens, tools such as bits screwdrivers, sockets, wrenches, or parts such as nuts, screws or nails.

Preferably, the tube 3 is made by transparent material, and includes a room 31 defined axially therein which opens through the top end of the tube 3 so as to put decorative items in the room 31 or to have fishes and plants farmed in the room 31.

Each pivotable member 4 includes a pivot 40 and a rod 41 which extends from one end of the pivotable member 4 and is connected to the pivot 40. Preferably, the pivot 40 is a ball-like pivot and pivotably received in the notch 11 corresponding thereto. The rod 41 is movably accommodated in the recessed area 12 corresponding thereto. A reception portion 42 is formed in the inside of each pivotable member 4, and a cover 45 is mounted to the reception portion 42 of each of the pivotable members 4 to close the reception portion 42. A hook 43 formed on the inside of each pivotably member 4, and the hook 43 of each pivotably member 4 is detachably hooked to the restriction recess 30 of the tube 3 corresponding thereto.

The base 5 includes a base board 50 which is connected to the underside of the body 1 and includes the positioning holes 51. An annular wall 52 extends upward from the periphery of the base board 50. Multiple radial holes 520 are defined through the annular wall 52 so as to accommodate a power control unit 7. A column 53 extends upward from the base board 50 and is connected with a light unit 8. The column 53 includes an accommodation area 530 which is used to receive a battery (not shown), a flash light (not shown), the light unit 8, or an insertion 90 of a bottom board 9. The top of the insertion 90 of the bottom board 9 contacts the underside of the accommodation area 530 so that the base 5 is rotatable relative to the bottom board 9 as shown in FIG. 4. The power control unit 7 may be a plug, a receptacle, a USB, a Type C connector, a switch or the like. The light unit 8 can be a light bulb, an LED bulb 81 on a circuit board 80, a LED bulb 81, or a flash light.

Figure 2:
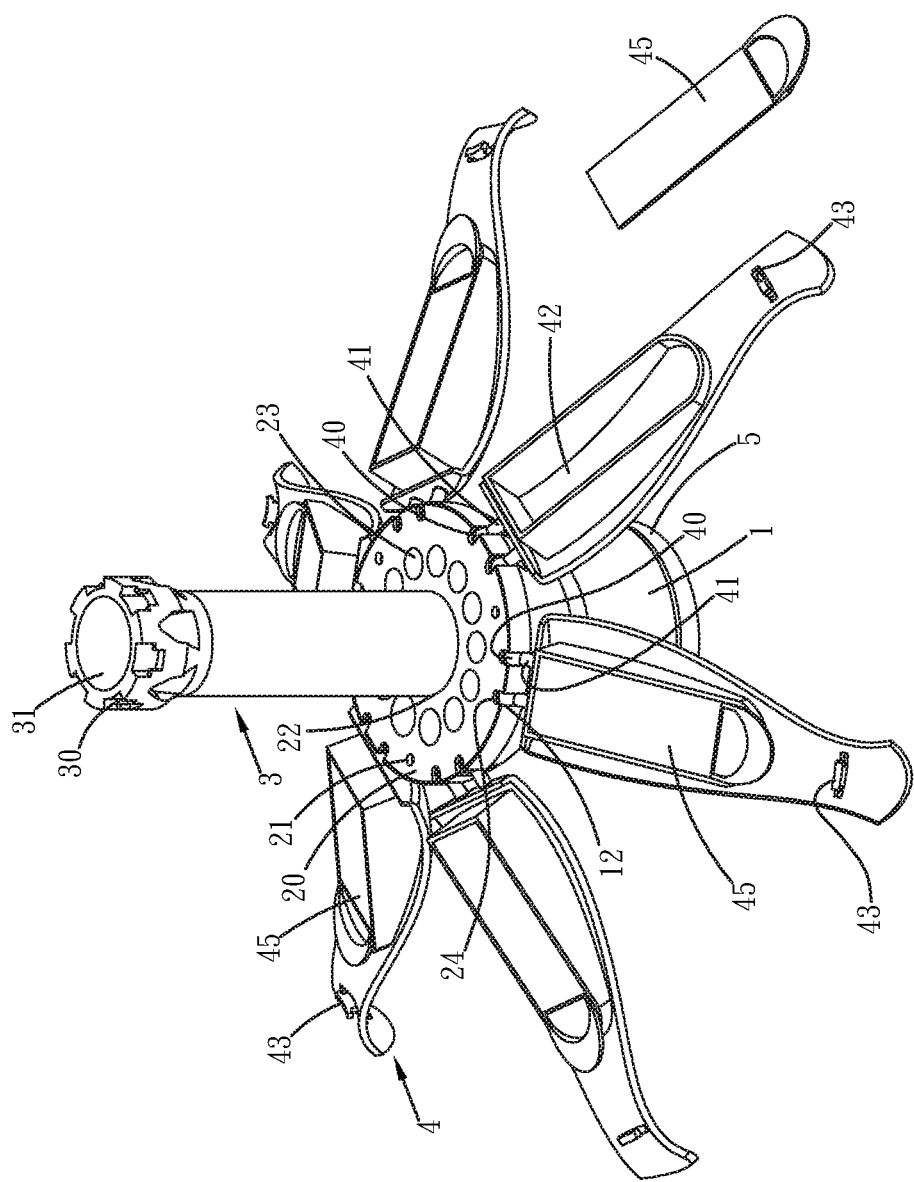
FIG. 2 is a perspective view to show the storage assembly of the present invention, wherein the pivotable members are expanded.
Figure 3:
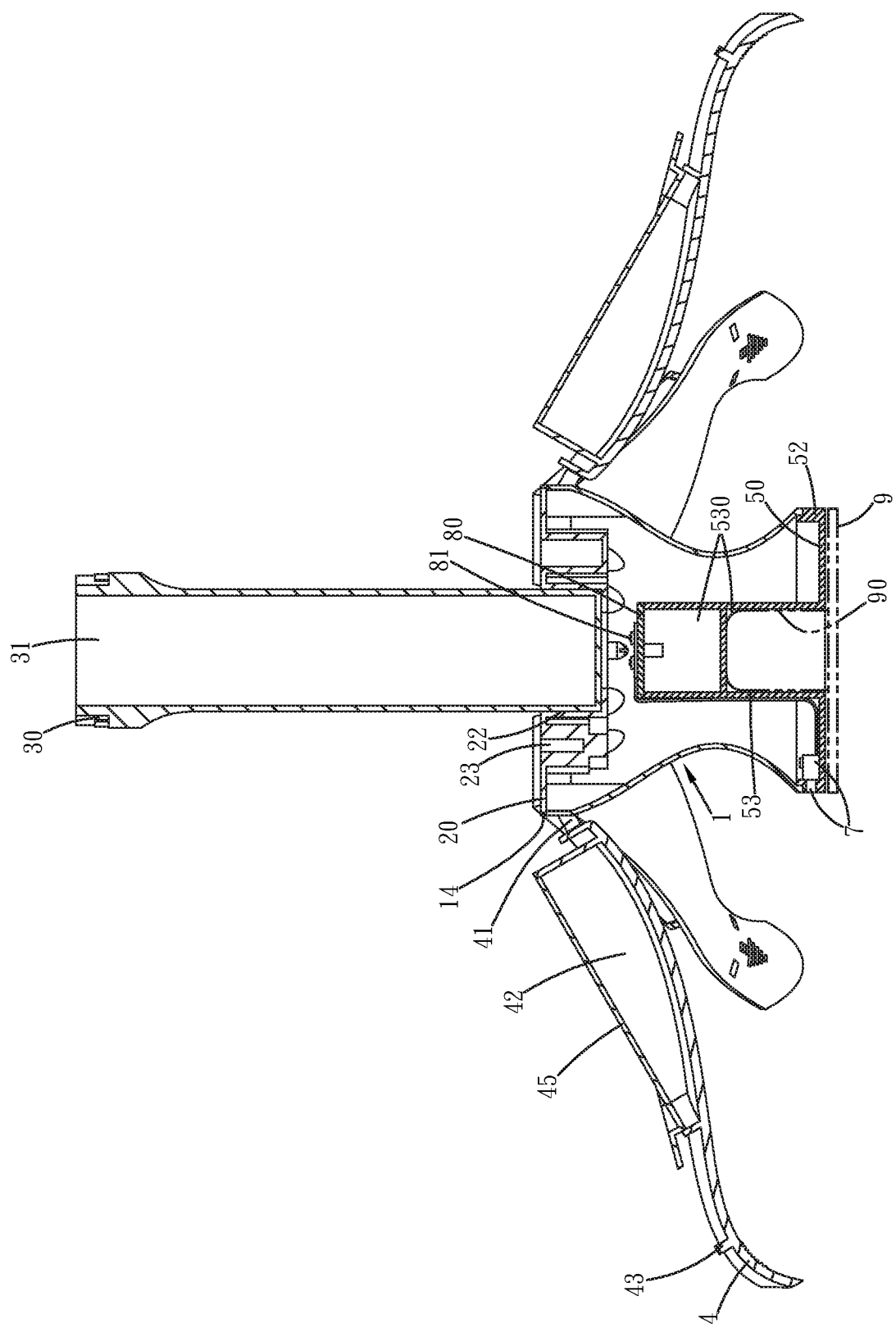
FIG. 3 is a cross sectional view of the storage assembly of the present invention.
Figure 6:
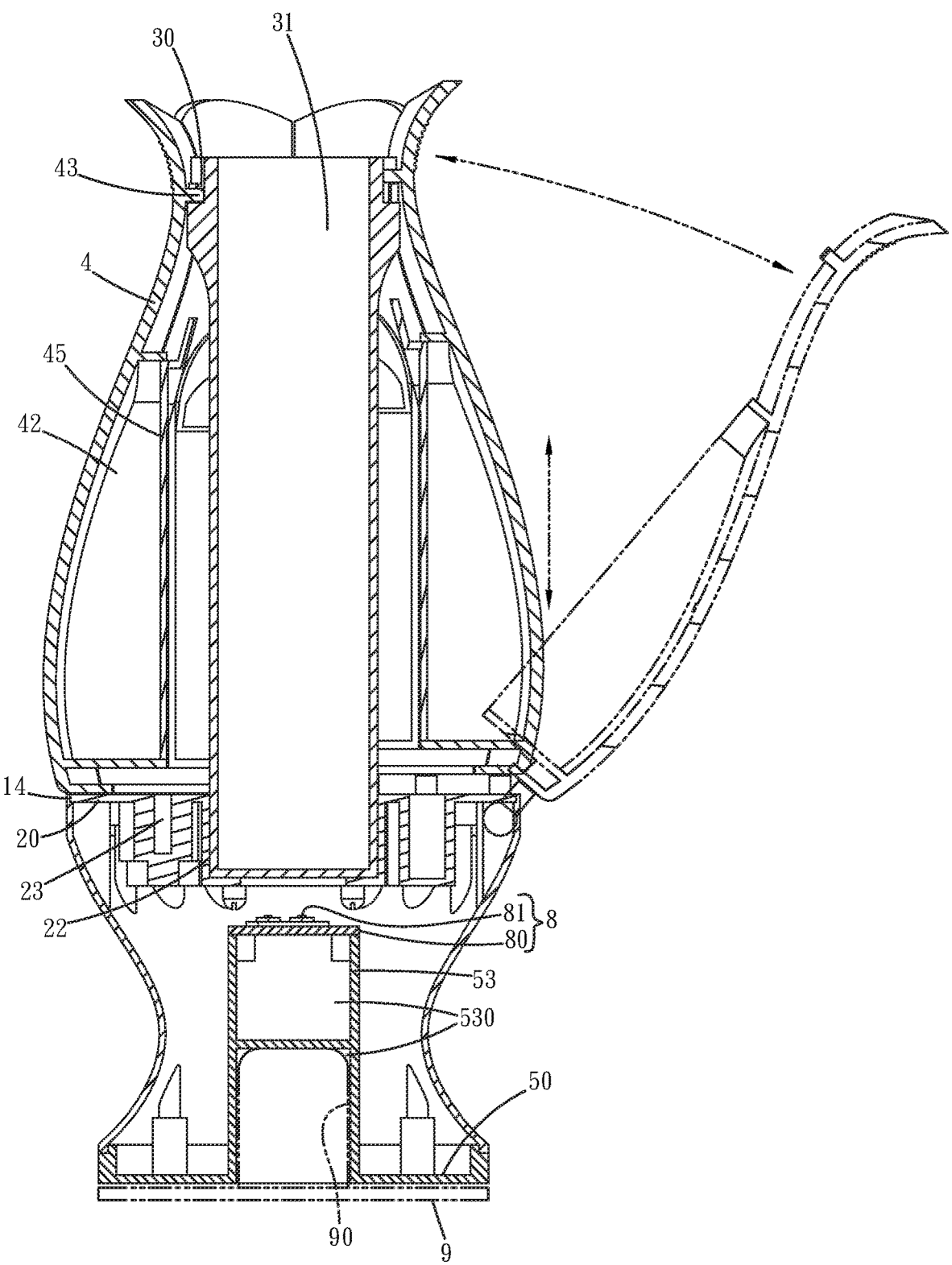
FIG. 6 is a cross sectional view of the storage assembly of the present invention, wherein the pivotable members are folded.

When pushing the pivotable members 4 upward as shown in FIG. 6, the hooks 43 and the pivots 40 are moved upward until the pivots 40 are restricted by the openings 24 so that the pivots 40 will contact the underside of the board 20. The hooks 43 will move to the top of the restriction recesses 30, therefore, the hooks 43 are no longer restricted by the restriction recesses 30, and the pivotable members 4 are pivoted outward and the rods 41 move from the openings 24 to the recessed areas 12 as shown in FIGS. 3, 4 and 6, until the pivotable members 4 touch the floor or the table as shown in FIGS. 3 and 4. The covers 45 then can be opened as shown in FIG. 2, to access the reception portions 42.

Figure 5:
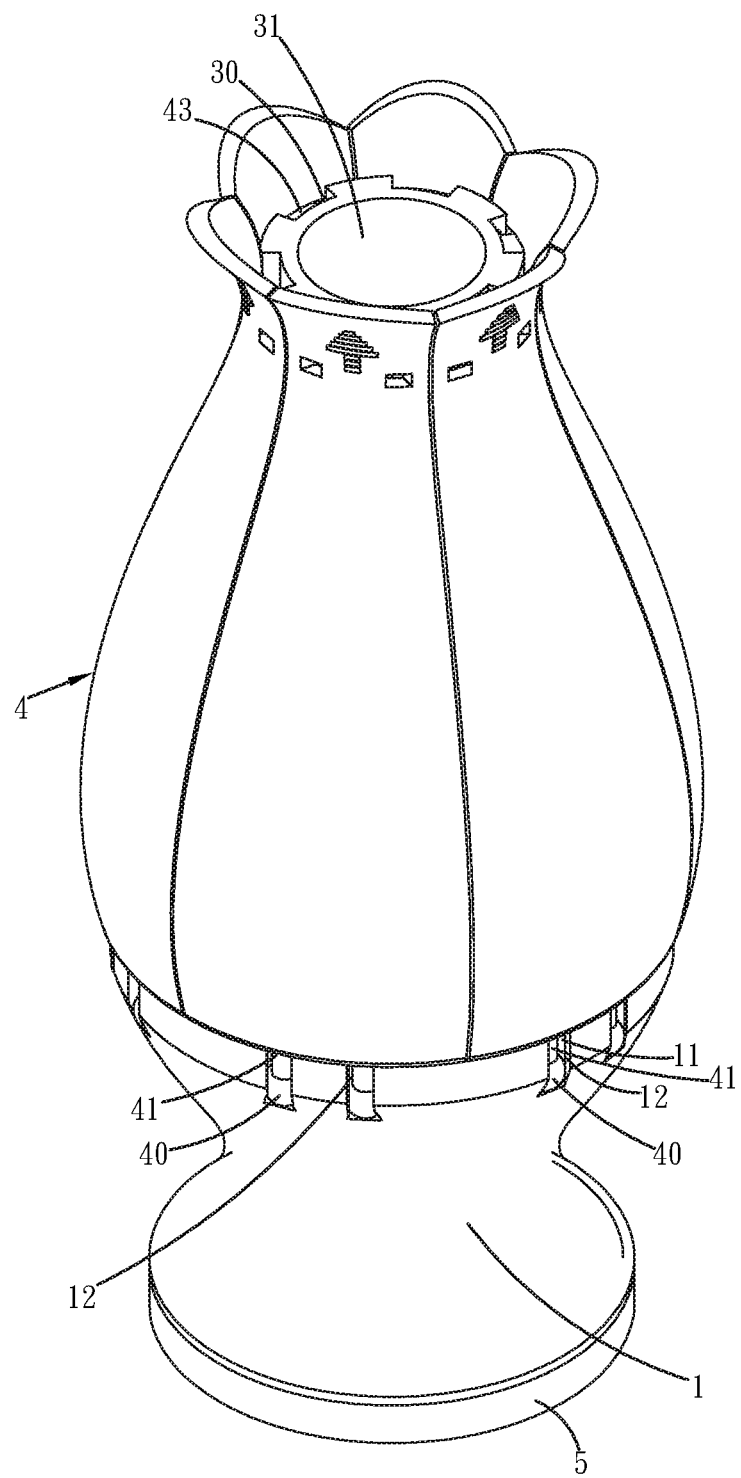
FIG. 5 is a perspective view to show the storage assembly of the present invention, wherein the pivotable members are folded.

On the contrary, when folding the pivotable members 4, the pivotable members 4 are pivoted toward the tube 3 to move the rods 41 from the recessed areas 12 to the openings 24 until the hooks 43 are moved above of the restriction recesses 30 of the tube 3. The users then push the pivotable members 4 downward to hook the hooks 43 to the restriction recesses 30 of the tube 3 as shown in FIGS. 5 and 6.

The users may operate the power control unit 7 such as switch to ON, and the LED bulb 81 on the column 53 lights up. The light passes through the through holes 221 of the tray 2 and the transparent tube 3 to use as a night light.

Alternatively, the pivotably members 4 are folded toward the tube 3 and block the light that pass through the tube 3, and only a light beam passes through the top of the tube 3.

As mentioned before, fishes and plants can be farmed in the room 31 of the tube 3, and the light from the LED bulb 81 passes through the water in the room 31 of the tube 3 to create a light-and-shadow feature. Of course flowers can also be put in the room 31 of the tube 3.

The cost of the molds for the body 1, the tray 2, the tube 3, the pivotable members 4 and the base 5 will be reduced. The pivotal action of the pivots 42 and the rods 41 relative to the notches 11, the openings 24, and the recessed area 12 is smooth and stable.

Figure 7:
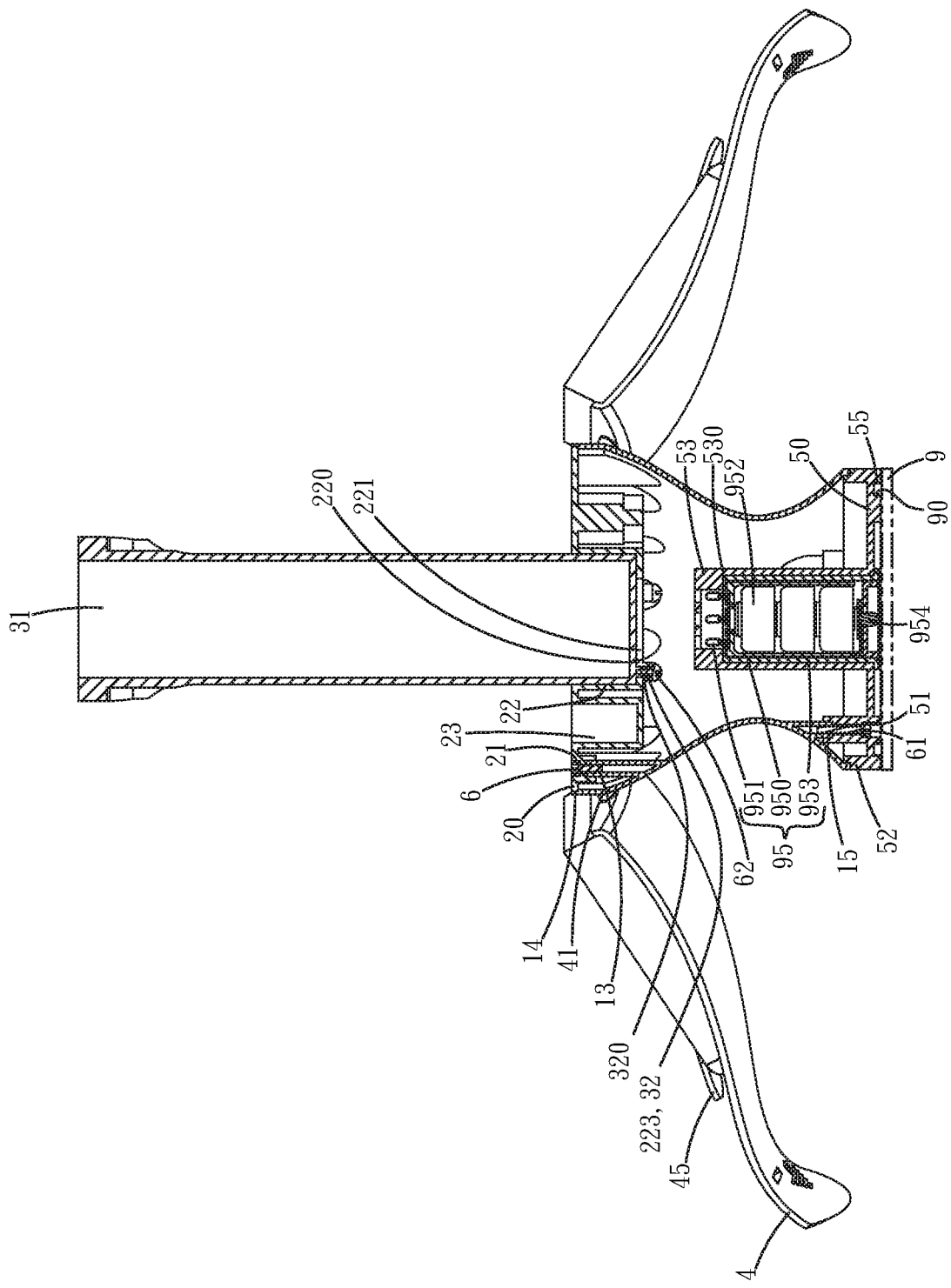
FIG. 7 is a cross sectional view of the second embodiment of the storage assembly of the present invention.

As shown in FIG. 7 which shows the second embodiment of the storage assembly of the present invention, the difference is that the accommodation area 530 of column 53 is a stepped and recessed accommodation area 530 which is used to receive a battery (not shown), the light unit 8, or a light device 95. The light device 95 includes a housing 950, a LED bulb 951 connected to the housing 950, a battery 952 in the housing 950, cables 953 connected between the LED bulb 951 and the battery 952, and a switch 954. An annular groove 55 is defined in base board 50, and the insertion 90 of the bottom board 9 is inserted in the annular groove 55 so that the base 5 is rotatable relative to the bottom board 9.

While we have shown and described the embodiment in accordance with the present invention, it should be clear to those skilled in the art that further embodiments may be made without departing from the scope of the present invention.

What is claimed is:

1. A storage assembly comprising:
a body, a tray connected to a top of the body, multiple bolts connecting the tray to the body, a tube connected to a connection portion of the tray, multiple pivotable members pivotably connected to the body and the tray, the pivotable members enclosing the tube or pivoted outward relative to the tube;
the body having multiple notches defined in the top thereof, multiple recessed areas defined along an outer periphery of the body and communicating with the notches respectively,
the tray including a board which includes multiple bores, the connection portion defined in a center of the tray, the multiple bolts extending through the bores of the board and connected to top threaded holes of the body;
the tube includes a first end inserted into the connection portion of the tray, a second end of the tube including multiple restriction recesses, and
each pivotable member including a pivot and a rod which extends from one end of the pivotable member and is connected to the pivot, the pivot pivotably received in the notch corresponding thereto, the rod movably accommodated in the recessed area corresponding thereto, a reception portion formed in an inside of each pivotable member, a hook formed on the inside of each pivotably member, multiple top threaded holes defined in the top of the body, the hook of each pivotably member detachably hooked to the restriction recess of the tube corresponding thereto.

2. The storage assembly as claimed in claim 1, wherein a maximum width of each of the recessed areas is smaller than a maximum diameter of each of the notches.

3. The storage assembly as claimed in claim 1, wherein the board of the tray includes multiple openings defined in an outer periphery thereof, the openings each are located corresponding to the notch and the recessed area corresponding thereto, a width of each of the openings is smaller than a maximum diameter of the notch corresponding thereto, the width of each of the openings is larger than a maximum diameter of the rod corresponding thereto, so that the rod removably enters into the opening.

4. The storage assembly as claimed in claim 3, wherein the width of each of the openings is smaller than a maximum diameter of the pivot corresponding thereto so that the pivot is restricted within the notch.

5. The storage assembly as claimed in claim 4, wherein the board of the tray has multiple reception areas defined therein which are located between the connection portion and the openings.

6. The storage assembly as claimed in claim 5, wherein the body includes multiple flanges extending upward along the top thereof so as to a shoulder between the flanges and an inner periphery of the body, the board of the tray is restricted by the flanges.

7. The storage assembly as claimed in claim 6, wherein the shoulder formed by each of the flanges is not lower than a top edge of each of the notches.

8. The storage assembly as claimed in claim 6, wherein each of the flanges is located between two consecutive notches.

9. The storage assembly as claimed in claim 8, wherein the tube includes a room defined axially therein which opens through a top end of the tube.

10. The storage assembly as claimed in claim 8, wherein a cover is mounted to the reception portion of each of the pivotable members to close the reception portion.

11. The storage assembly as claimed in claim 8, wherein the body includes a space defined through the top and a bottom thereof, multiple bottom threaded holes are formed in the inner periphery of the body and open toward the underside of the body, a base includes multiple positioning holes, a bolt extends through each of the positioning holes and is connected to each of the bottom threaded holes to connect the base to the body.

12. The storage assembly as claimed in claim 11, wherein the base includes a base board which is connected to the underside of the body and includes the positioning holes, an annular wall extends upward from a periphery of the base board, multiple radial holes are defined through the annular wall so as to be adapted to accommodate a power control unit, a column extends upward from the base board and is adapted to be connected with a light unit.

13. The storage assembly as claimed in claim 12, wherein the column includes an accommodation area which is adapted to receive a battery or the light unit, a bottom board includes an insertion which is accommodated in the accommodation area, the light unit is a light bulb or a Light Emission Diode (LED) bulb on a circuit board, or an LED bulb.

14. The storage assembly as claimed in claim 11, wherein the base includes a base board which is connected to the underside of the body and includes the positioning holes, an annular wall extends upward from a periphery of the base board, a column extends upward from the base board.

15. The storage assembly as claimed in claim 14, wherein the column includes an accommodation area which is a recessed accommodation area and adapted to receive a battery, the light unit, or a light device.

* * * * *